US008765828B2

(12) United States Patent
Casati et al.

(10) Patent No.: US 8,765,828 B2
(45) Date of Patent: Jul. 1, 2014

(54) FLEXIBLE FOAMS

(75) Inventors: Francois M. Casati, Pfaffikon (CH); Margarita Perello, Duebendorf (CH)

(73) Assignee: Dow Global Technologies LLC, Midland, MI (US)

( * ) Notice: Subject to any disclaimer, the term of this patent is extended or adjusted under 35 U.S.C. 154(b) by 249 days.

(21) Appl. No.: 12/863,486

(22) PCT Filed: Jan. 13, 2009

(86) PCT No.: PCT/US2009/030841
§ 371 (c)(1),
(2), (4) Date: Jul. 19, 2010

(87) PCT Pub. No.: WO2009/099718
PCT Pub. Date: Aug. 13, 2009

(65) Prior Publication Data
US 2010/0286298 A1 Nov. 11, 2010

Related U.S. Application Data

(60) Provisional application No. 61/027,083, filed on Feb. 8, 2008.

(51) Int. Cl.
*C08G 18/28* (2006.01)
(52) U.S. Cl.
USPC ........... 521/134; 521/137; 521/170; 521/172; 521/174

(58) Field of Classification Search
USPC .......................... 521/134, 137, 170, 172, 174
See application file for complete search history.

(56) References Cited

U.S. PATENT DOCUMENTS

| | | | |
|---|---|---|---|
| 3,755,211 A | 8/1973 | Fabris et al. | |
| 4,049,590 A | 9/1977 | Falkenstein et al. | |
| 4,243,755 A | 1/1981 | Marx et al. | |
| 4,439,548 A | 3/1984 | Weisman | |
| 5,312,847 A | 5/1994 | de Vos | |
| 5,824,713 A * | 10/1998 | Schmitz et al. | 521/155 |
| 6,613,827 B2 * | 9/2003 | Lundgard et al. | 524/386 |
| 7,179,845 B2 * | 2/2007 | Taylor | 521/131 |
| 7,750,108 B2 | 7/2010 | Lysenko et al. | |
| 2005/0261386 A1 | 11/2005 | Schneider et al. | |

FOREIGN PATENT DOCUMENTS

| | | |
|---|---|---|
| GB | 1097009 A | 12/1967 |
| GB | 1419833 A | 12/1975 |
| WO | WO-2006/116456 A1 | 11/2006 |

* cited by examiner

*Primary Examiner* — John Cooney

(57) ABSTRACT

Polyurethane foams of improved resilience properties can be produced from: a) a polyisocyanate, b) a polyether polyol or polyester polyol, c) a blowing agent, d) one or more optional additives or auxiliary compounds, and e) a redispersible polymer powder based on a homopolymer or copolymer of one or more monomers from the group consisting of vinyl esters of un-branched or branched alkylcarboxylic acids having from 1 to 15 carbon atoms, methacrylic esters and acrylic esters of alcohols having from 1 to 15 carbon atoms, vinylaromatics, olefins, dienes and vinyl halides.

12 Claims, No Drawings

FLEXIBLE FOAMS

BACKGROUND OF THE INVENTION

The invention relates to polyurethane foams, particularly to flexible polyurethane foams, and to a process for its preparation.

Polyurethane foams generally are prepared by reacting, in the presence of a blowing agent, a polyisocyanate with a polyether polyol or polyester polyol. The production of polyurethane foams is well known in the art. Flexible polyurethane foams are widely used for cushioning applications. Accordingly, the skilled artisans constantly seek ways for improving properties important for cushioning applications, such as load bearing properties and resilience, without impacting compression sets.

U.S. Patent Application Publication 2005/0261386 claims a "Latex-enhanced Polyurethane 'Foam Cusioning'" by reaction of a polyol and an isocyanate including the use of a latex material to produce a 'Foam cushioning' having a CVR comfort value of more than 2.30 and up to about 2.60. This latex is vulcanizable and polymerizes during foam formation.

U.S. Pat. No. 3,755,211 discloses a process for preparing a flexible polyurethane foam with improved load carrying capacity by adding a polymer in the form of an unfoamed latex to an unfoamed mixture of a polyhydroxy compound, an organic polyisocyanate and water. The latex is an aqueous dispersion of a polymer, such as a polymethylmethacrylate latex, a polystyrene latex or a vinyl chloride-polyacrylate copolymer latex. The patent teaches that the glass transition temperature of the polymer must be greater than 50° C. to improve the load bearing property of the polyurethane foam. The polymer particles have a size of 200 to 800 angstroms (20 to 80 nanometers). The latex has a solid contents of 30 to 65 percent.

U.S. Pat. No. 5,312,847 discloses a polyurethane foam containing a particulate organic polymer having a glass transition temperature of less than 0° C. A preferred type of particulate organic polymer is a styrene/1,3-butadiene polymer. The particulate organic polymer is incorporated into the reaction mixture for producing the polyurethane foam in the form of a latex, preferably a latex wherein the discontinuous phase is water. The incorporation of the latex in the polyurethane formulation enhances the comfort aspect and SAG factor performance of the foam.

While the use of the latices disclosed in the above-mentioned U.S. patent publications improve some properties of flexible polyurethane foams, the use of these lattices is not unproblematic. The continuous water phase of the latex is a blowing agent for polyurethane foam. Accordingly, the amount of latex cannot be freely chosen to adjust the properties of the polyurethane foam. Also, commercially available polymer latices contain stabilizers to maintain the polymer particles in dispersion. The inventors of the present invention have found that such stabilizers may coagulate with components of the polyurethane composition, which has a detrimental effect on aging properties of the polyurethane foam, such as compression set.

Accordingly, it would be desirable to find a new way to further improve important properties of polyurethane foams, such as cushioning properties of flexible polyurethane foams.

Surprisingly, it has been found that the resilience of a flexible polyurethane foam can be increased by incorporating a redispersible polymer powder in the reaction mixture which is used to produce the flexible polyurethane foam.

Furthermore the redispersible polymer powder gives reduced foam load bearing at constant isocyanate index.

SUMMARY OF THE INVENTION

One aspect of the present invention is a multi-component polyurethane foam-forming system comprising
  a) a polyisocyanate,
  b) a polyether polyol or polyester polyol,
  c) a blowing agent, and
  d) optionally one or more additives or auxiliary compounds,
wherein the components a) to d) can be combined or separate provided that components a) and b) are separate components of the multi-component polyurethane foam-forming system, and
wherein the polyurethane foam-forming system additionally comprises
  e) a redispersible polymer powder based on a homopolymer or copolymer of one or more monomers from the group consisting of vinyl esters of unbranched or branched alkylcarboxylic acids having from 1 to 15 carbon atoms, methacrylic esters and acrylic esters of alcohols having from 1 to 15 carbon atoms, vinylaromatics, olefins, dienes and vinyl halides.

Another aspect of the present invention is a polyurethane foam produced from:
  a) a polyisocyanate,
  b) a polyether polyol or polyester polyol,
  c) a blowing agent,
  d) optionally one or more additives or auxiliary compounds, and
  e) a redispersible polymer powder based on a homopolymer or copolymer of one or more monomers from the group consisting of vinyl esters of unbranched or branched alkylcarboxylic acids having from 1 to 15 carbon atoms, methacrylic esters and acrylic esters of alcohols having from 1 to 15 carbon atoms, vinylaromatics, olefins, dienes and vinyl halides.

Yet another aspect of the present invention is process for preparing a polyurethane foam from:
  a) a polyisocyanate,
  b) a polyether polyol or polyester polyol,
  c) a blowing agent, and
  d) optionally one or more additives or auxiliary compounds, which comprises the step of incorporating into a reaction mixture comprising components a), b), c) and optionally d), prior to the formation of the polyurethane foam,
  e) a redispersible polymer powder based on a homopolymer or copolymer of one or more monomers from the group consisting of vinyl esters of unbranched or branched alkylcarboxylic acids having from 1 to 15 carbon atoms, methacrylic esters and acrylic esters of alcohols having from 1 to 15 carbon atoms, vinylaromatics, olefins, dienes and vinyl halides.

Yet another aspect of the present invention is a method of increasing the resilience of a flexible polyurethane foam which comprises the step of incorporating a water-redispersible polymer powder based on a homopolymer or copolymer of one or more monomers from the group consisting of vinyl esters of unbranched or branched alkylcarboxylic acids having from 1 to 15 carbon atoms, methacrylic esters and acrylic esters of alcohols having from 1 to 15 carbon atoms, vinylaromatics, olefins, dienes and vinyl halides, into a reaction mixture comprising a) a polyisocyanate, b) a polyether polyol or polyester polyol, c) a blowing agent, and d) one or more optional additives or auxiliary compounds, and processing the reaction mixture into a flexible polyurethane foam.

DETAILED DESCRIPTION OF THE INVENTION

In one aspect the present invention relates to a multi-component polyurethane foam-forming system which comprise a) a polyisocyanate, b) a polyether polyol or polyester polyol, c) a blowing agent, and d) one or more optional additives or auxiliary compounds.

The term "multi-component system" as used herein is a system wherein two or more components are separately packed for storage purposes prior to their use for preparing a polyurethane foam. Components a) and b) are separate components of the multi-component polyurethane foam-forming system and are separately packed for storage. Depending on their specific chemical nature and other aspects such as convenience in handling, the blowing agent c) and one or more optional additives or auxiliary compounds d) are stored in combination or separately or in combination with components a) or b) prior to their use. The skilled artisan knows which components are suitably stored in combination or separately prior their use for producing the polyurethane foam.

The polyurethane foam-forming system additionally comprises a redispersible polymer powder e) based on a homopolymer or copolymer of one or more monomers from the group consisting of vinyl esters of unbranched or branched alkylcarboxylic acids having from 1 to 15 carbon atoms, methacrylic esters and acrylic esters of alcohols having from 1 to 15 carbon atoms, vinylaromatics, olefins, dienes and vinyl halides. Water-redispersible polymer powders based on the above-mentioned homopolymers or copolymers and their use in coating compositions, or as adhesives for a variety of substrates, such as binders in hydraulically setting adhesives, e.g. in mortars, and in tile adhesives based on cements or plaster are known from US Patent Application Publication 2005/0014881.

In one aspect of the present invention it has been surprisingly found that the redispersible polymer powder is useful for improving the resilience (ball rebound) of polyurethane foams, particularly of flexible polyurethane foams. It has been found that the hardness or flexibility of the polyurethane foam can be adjusted by varying the amount of the redispersible polymer powder in the polyurethane formulation. The powder is easy to handle and can be easily shipped in bags. Its amount is not limited as in the case of a latex wherein the amount of water in the latex is the limiting factor for incorporating the latex in the polyurethane foam formulation.

In another aspect of the present invention it has surprisingly been found that redispersible polymer powders can act as a co-catalyst in the production of a polyurethane foam. This allows a reduction of the amount of catalyst used for producing polyurethane foams. Many organometallic catalysts, such as stannous octoate, tend to emit volatile organic compounds by releasing their acid upon foam aging. Hence a reduction of their use is beneficial for ecological reasons.

In yet another aspect of the present invention it has surprisingly been found that the use of redispersible polymer powders in polyurethane foams allows the production of flexible polyurethane foams at a high isocyanate index.

As used herein the term polyol means those materials having at least one group containing an active hydrogen atom capable of undergoing reaction with an isocyanate. Preferred among such compounds are materials having at least two hydroxyls, primary or secondary, or at least two amines, primary or secondary, carboxylic acid, or thiol groups per molecule. Compounds having at least two hydroxyl groups or at least two amine groups per molecule are especially preferred due to their desirable reactivity with polyisocyanates.

Polyether polyols based on the polymerization of alkylene oxides, and/or polyester polyols, are the major components of a polyurethane system together with isocyanates. Polyols can also be filled polyols, such as SAN (Styrene/Acrylonitrile), PIPA (polyisocyanate polyaddition) or PHD (polyurea) polyols.

Suitable polyols (b) that can be used to produce polyurethane foams of the present invention are well known in the art and include those described herein and any other commercially available polyol and/or SAN, PIPA or PHD copolymer polyols. Such polyols are described in "Polyurethane Handbook", by G. Oertel, Hanser publishers. Mixtures of one or more polyols and/or one or more copolymer polyols may also be used to produce polyurethane products according to the present invention.

Representative polyols include polyether polyols, polyester polyols, polyhydroxy-terminated acetal resins, hydroxyl-terminated amines and polyamines. Natural oil based polyols can also be used. Examples of these and other suitable isocyanate-reactive materials are described more fully in U.S. Pat. No. 4,394,491. Alternative polyols that may be used include polyalkylene carbonate-based polyols and polyphosphate-based polyols. Preferred are polyols prepared by adding an alkylene oxide, such as ethylene oxide, propylene oxide, butylene oxide or a combination thereof, to an initiator or blend of initiators to give a final polyol a nominal functionality having from 2 to 8, preferably 2 to 6, more preferably 2.1 to 4 active hydrogen atoms. Catalysis for this polymerization can be either anionic or cationic, with catalysts such as KOH, CsOH, boron trifluoride, or a double cyanide complex (DMC) catalyst such as zinc hexacyanocobaltate, or quaternary phosphazenium compounds. In the case of alkaline catalysts, these are eliminated from the polyol at the end of production by a proper finishing step, such as coalescence, magnesium silicate (magsil) separation, ion exchange or less preferably by acid neutralization. In the case of DMC catalyst produced polyols, the finishing step can be avoided.

The polyols or blends thereof employed depend upon the end use of the polyurethane foam to be produced. The hydroxyl number and molecular weight of the polyol or polyols employed can vary accordingly over a wide range. In general, the hydroxyl number of the polyols employed for use in producing a foam may range from 15 to 400.

In the production of a flexible polyurethane foam, the polyol is preferably a polyether polyol and/or a polyester polyol or a polyetherester polyol. The polyol generally has an average functionality ranging from 2 to 5, preferably 2 to 4, and an average hydroxyl number ranging from 15 to 300 mg KOH/g, preferably from 20 to 200, and more preferably from 20 to 100 mg KOH/g. As a further refinement, the specific foam application will likewise influence the choice of base polyol. As an example, for flexible molded foam, the hydroxyl number of the base polyol may be on the order of 20 to 60 with ethylene oxide (EO) capping, and for flexible slabstock foams the hydroxyl number may be on the order of 25 to 75 and is either mixed feed EO/PO (propylene oxide) or is only slightly capped with EO or is 100 percent PO based.

High resilience flexible slabstock (HR slabstock) foam is made in methods similar to those used to make conventional flexible slabstock foam but using higher equivalent weight polyols. HR flexible slabstock foams are characterized in exhibiting a ball rebound score of at least 40 percent measured according to the procedures of ASTM 3574.93. Water levels generally are from about 2 to about 6, especially from about 3 to about 5 parts per 100 parts by weight of polyols. In contrast, viscoelastic foams often contain lower equivalent weight polyols and have ball rebound values below 25 percent as measured according to the procedure of ASTM 3574.93. Water levels generally are from about 1 to about 3, especially from about 1.1 to about 2.5 parts by weight of polyol.

The initiators for the production of polyols (b) generally have 2 to 8 functional groups that will react with the alkylene oxide and do not contain nitrogen. Examples of suitable initiator molecules are water, organic dicarboxylic acids, such as succinic acid, adipic acid, phthalic acid and terephthalic acid and polyhydric, in particular dihydric to octahydric alcohols or dialkylene glycols, for example ethanediol, 1,2- and 1,3-propanediol, diethylene glycol, dipropylene glycol, 1,4-butanediol, 1,6-hexanediol, glycerol, trimethylolpropane, pentaerythritol, sorbitol and sucrose or blends thereof.

All or part of polyols of (b) can also be based on or derived from renewable resources such as natural and/or genetically modified (GMO) plant vegetable seed oils and/or animal source fats. Examples of preferred vegetable oils include, for example, those from castor, soybean, olive, peanut, rapeseed, corn, sesame, cotton, canola, safflower, linseed, palm, sunflower seed oils, or a combination thereof. Preferably sources or renewable polyols are derived from soybean and/or castor and/or canola oils.

For use in the production of flexible polyurethane foam it is generally desirable to modify the natural materials to give the material isocyanate reactive groups or to increase the number of isocyanate reactive groups on the material. Preferably such reactive groups are a hydroxyl group. Such modifications of a renewable resource include, for example, epoxidation, as described in U.S. Pat. Nos. 6,107,433 or in 6,121,398; hydroxylation, such as described in WO 2003/029182; esterification such as described in U.S. Pat. Nos. 6,897,283; 6,962,636 or 6,979,477; hydroformylation as described in WO 2004/096744; grafting such as described in U.S. Pat. No. 4,640,801; or alkoxylation as described in U.S. Pat. No. 4,534,907 or in WO 2004/020497. The above cited references for modifying the natural products are incorporated herein by reference. After the production of such polyols by modification of the natural oils, the modified products may be further alkoxylated. The use of EO or mixtures of EO with other oxides, introduce hydrophilic moieties into the polyol.

A natural oil based polyols may also be obtained by a combination of the above modification techniques as disclosed in PCT Publications WO 2004/096882 and 2004/096883, and Applicant's copending application Ser. No. 60/676,348 entitled "Polyester Polyols Containing Secondary alcohol Groups and Their Use in Making Polyurethanes Such as Flexible Polyurethane Foams", the disclosures of which are incorporated herein by reference.

It has surprisingly been found that the incorporation of the water-redispersible polymer powder in the reaction mixture for producing the polyurethane foam-forming system of the present invention allows the use of polyols based on or derived from renewable resources while still producing a flexible foam of high resilience.

Polyols pre-reacted with polyisocyanates can also be used in the polyurethane formulation. Isocyanate prepolymers can be prepared with standard equipment, using conventional methods, such as heating the polyol in a reactor and adding slowly the isocyanate under stirring.

The polyisocyanates which may be used in the present invention include aliphatic, cycloaliphatic, arylaliphatic and aromatic polyisocyanates having at least 2 isocyanate groups. For the production of flexible slabstock foam, aromatic polyisocyanates are preferred. Examples of suitable aromatic polyisocyanates include the 4,4'-, 2,4' and 2,2'-isomers of diphenylmethane diisocyanate (MDI), blends thereof and polymeric and monomeric MDI blends, toluene-2,4- and 2,6-diisocyanates (TDI), m- and p-phenylenediisocyanate, chlorophenylene-2,4-diisocyanate, diphenylene-4,4'-diisocyanate, 4,4'-diisocyanate-3,3'-dimethyldiphenyl, 3-methyldiphenyl-methane-4,4'-diisocyanate and diphenyletherdiisocyanate and 2,4,6-triisocyanatotoluene and 2,4, 4'-triisocyanatodiphenylether.

Mixtures of isocyanates may be used, such as the commercially available mixtures of 2,4- and 2,6-isomers of toluene diisocyantes. A crude polyisocyanate may also be used in the practice of this invention, such as crude toluene diisocyanate obtained by the phosgenation of a mixture of toluene diamine or the crude diphenylmethane diisocyanate obtained by the phosgenation of crude methylene diphenylamine. TDI/MDI blends may also be used. MDI or TDI based prepolymers made with a polyol can also be used. Isocyanate-terminated prepolymers are prepared by reacting an excess of polyisocyanate with polyols, including aminated polyols or imines/enamines thereof, or polyamines.

Examples of aliphatic polyisocyanates include ethylene diisocyanate, 1,6-hexamethylene diisocyanate (HDI), isophorone diisocyanate (IPDI), cyclohexane 1,4-diisocyanate, 4,4'-dicyclohexylmethane diisocyanate ($H_{12}$MDI), saturated analogues of the above mentioned aromatic isocyanates and mixtures thereof.

The preferred polyisocyanates are the toluene-2,4- and 2,6-diisocyanates or MDI or combinations of TDI/MDI or prepolymers made therefrom.

For producing a polyurethane-based foam, a blowing agent is generally required. In the production of flexible polyurethane foams, water is preferred as the blowing agent. The amount of water is preferably in the range of from 0.5 to 10 parts by weight, more preferably from 2 to 7 parts by weight based on 100 parts by weight of the polyol and even more preferably the water is between 2 and 5 parts per hundred parts polyol. In some applications the water is preferably present at 3 parts or more by weight of the polyol. In some preferred embodiment, the water is present at 6 parts or less by weight of the polyol. Although not preferred, other blowing agents can be liquid or gaseous carbon dioxide, methylene chloride, acetone, pentane, isopentane, cyclopentane, methylal or dimethoxymethane, dimethylcarbonate. Use of artificially reduced, or increased, atmospheric pressure, such as disclosed in U.S. Pat. No. 5,194,453, or frothing, can also be contemplated with the present invention.

An additional essential component for producing the polyurethane foam of the present invention is a redispersible polymer powder (e) based on a homopolymer or copolymer of one or more "principle" monomers from the group consisting of vinyl esters of unbranched or branched alkylcarboxylic acids having from 1 to 15 carbon atoms, methacrylic esters and acrylic esters of alcohols having from 1 to 15 carbon atoms, vinylaromatics, olefins, dienes and vinyl halides. Water-redispersible polymer powders based on the above-mentioned homopolymers or copolymers and their use in coating compositions, or as adhesives for a variety of substrates, such as binders in hydraulically setting adhesives, e.g. in mortars, and in tile adhesives based on cements or plasters are known from US Patent Application Publication 2005/0014881. In addition to the homopolymer or copolymer the water-redispersible polymer powder generally comprises one or more protective colloids, and optionally, one or more antiblocking agents.

The water-redispersible polymer powder is preferably based on a homopolymer or copolymer of one or more monomers listed below.

Preferred vinyl esters of unbranched or branched alkylcarboxylic acids are vinyl acetate, vinyl propionate, vinyl butyrate, vinyl 2-ethylhexanoate, vinyl laurate, 1-methylvinyl acetate, vinyl pivalate and vinyl esters of alpha-branched monocarboxylic acids having from 9 to 13 carbon atoms, for example VeoVa9 or VeoVa10. (trade names of Resolution Performance Products). Particular preference is given to vinyl acetate.

Preferred methacrylic esters and acrylic esters of unbranched or branched alcohols having from 1 to 15 carbon atoms are methyl acrylate, methyl methacrylate, ethyl acrylate, ethyl methacrylate, propyl acrylate, propyl methacrylate, n-butyl acrylate, n-butyl methacrylate, 2-ethylhexyl acrylate, and norbornyl acrylate. Preference is given to methyl acrylate, methyl methacrylate, n-butyl acrylate and 2-ethylhexyl acrylate.

Examples of olefins and dienes are ethylene, propylene and 1,3-butadiene. Suitable vinylaromatics are styrene and vinyltoluene. A suitable vinyl halide is vinyl chloride.

If desired, from 0.05 to 50% by weight, preferably from 1 to 10% by weight, based on the total weight of the base polymer, of one or more auxiliary monomers can be copolymerized. Examples of auxiliary monomers are ethylenically unsaturated monocarboxylic and dicarboxylic acids, preferably acrylic acid, methacrylic acid, fumaric acid and maleic acid; ethylenically unsaturated carboxamides and nitriles, preferably acrylamide and acrylonitrile; monoesters and diesters of fumaric acid and maleic acid, e.g. the diethyl and diisopropyl esters, and also maleic anhydride, ethylenically unsaturated sulfonic acids and salts thereof, preferably vinylsulfonic acid, and 2-acrylamido-2-methylpropanesulfonic acid. Further examples are precrosslinking comonomers such as multiply ethylenically unsaturated comonomers, for example divinyl adipitate, diallyl maleate, allyl methacrylate or triallyl cyanurate, and also postcrosslinking comonomers, for example acrylamidoglycolic acid (AGA), methyl methylacrylamidoglycolate (MMAG), N-methylolacrylamide (NMA), N-methylolmethacrylamide (NMMA), allyl N-methylolcarbamate, alkyl ethers such as the isobutoxy ether, or alkyl esters of N-methylolacrylamide, of N-methylolmethacrylamide and of allyl N-methylolcarbamate. Also suitable are epoxy-functional comonomers such as glycidyl methacrylate and glycidyl acrylate. Further examples are silicon-functional comonomers such as acryloxypropyltri(alkoxy)silanes and methacryloxypropyltri(alkoxy)silanes, vinyltrialkoxysilanes and vinylmethyldialkoxysilanes, where the alkoxy groups present may be, for example, methoxy, ethoxy and ethoxypropylene glycol ether radicals. Useful are also monomers containing hydroxy or CO groups, for example hydroxyalkyl esters of methacrylic acid and acrylic acid, e.g. hydroxyethyl, hydroxypropyl or hydroxybutyl acrylate or methacrylate, and also compounds such as diacetoneacrylamide and acetylacetoxyethyl acrylate or methacrylate.

Examples of suitable homopolymers and copolymers are vinyl acetate homopolymers, copolymers of vinyl acetate with ethylene, copolymers of vinyl acetate with ethylene and one or more further comonomers, such as a vinyl ester, an acrylic ester, or vinyl chloride; styrene-acrylic ester copolymers, and styrene-1,3-butadiene copolymers, particularly carboxylated styrene/1,3-butadiene copolymers.

Preference is given to vinyl acetate homopolymers; copolymers of vinyl acetate with from 1 to 40% by weight of ethylene; copolymers of vinyl acetate with from 1 to 40% by weight of ethylene and from 1 to 50% by weight of one or more further comonomers selected from the group consisting of vinyl esters having from 1 to 12 carbon atoms in the carboxylic acid radical, e.g. vinyl propionate, vinyl laurate, vinyl esters of alpha-branched carboxylic acids having from 9 to 13 carbon atoms, e.g. VeoVa9 (trademark), VeoVa10 (trademark), VeoVa11 (trademark); copolymers of vinyl acetate, from 1 to 40% by weight of ethylene and preferably from 1 to 60% by weight of acrylic esters of unbranched or branched alcohols having from 1 to 15 carbon atoms, in particular n-butyl acrylate or 2-ethylhexyl acrylate; and copolymers comprising from 30 to 75% by weight of vinyl acetate, from 1 to 30% by weight of vinyl laurate or vinyl esters of an alpha-branched carboxylic acid having from 9 to 11 carbon atoms and also from 1 to 30% by weight of acrylic esters of unbranched or branched alcohols having from 1 to 15 carbon atoms, in particular n-butyl acrylate or 2-ethylhexyl acrylate, and additionally containing from 1 to 40% by weight of ethylene; copolymers comprising vinyl acetate, from 1 to 40% by weight of ethylene and from 1 to 60% by weight of vinyl chloride; where the auxiliary monomers mentioned may also be present in the polymers in the specified amounts and the percentages by weight in each case add up to 100% by weight.

Preference is also given to methacrylic ester and acrylic ester polymers such as copolymers of n-butyl acrylate or 2-ethylhexyl acrylate or copolymers of methyl methacrylate with n-butyl acrylate and/or 2-ethylhexyl acrylate; styrene-acrylic ester copolymers comprising one or more monomers from the group consisting of methyl acrylate, ethyl acrylate, propyl acrylate, n-butyl acrylate, 2-ethylhexyl acrylate; vinyl acetate-acrylic ester copolymers comprising one or more monomers from the group consisting of methyl acrylate, ethyl acrylate, propyl acrylate, n-butyl acrylate, 2-ethylhexyl acrylate and, if desired, ethylene; styrene-1,3-butadiene copolymer; where the auxiliary monomers mentioned may also be present in the polymers in the specified amounts and the percentages by weight in each case add up to 100% by weight.

The monomers and the proportions by weight of the comonomers are generally chosen so that, in general, a glass transition temperature Tg of from −60° C. to +80° C., preferably from −20° C. to +50° C., more preferably from −10° C. to +30° C. results. The glass transition temperature Tg of the polymers can be determined in a known manner by means of differential scanning calorimetry (DSC).

The homopolymers and copolymers can be prepared by an emulsion polymerization process or a suspension polymerization process, preferably by a emulsion polymerization process. The polymerization temperature is generally from 40° C. to 100° C., preferably from 60° C. to 90° C. The copolymerization of gaseous comonomers such as ethylene, 1,3-butadiene or vinyl chloride can also be carried out under superatmospheric pressure, in general at from 5 bar to 100 bar.

The polymerization is typically initiated by means of water-soluble or monomer-soluble initiators or redox initiator combinations customary for emulsion polymerization or suspension polymerization. Examples of water-soluble initiators are the sodium, potassium and ammonium salts of peroxodisulfuric acid, hydrogen peroxide, t-butyl peroxide, t-butyl hydroperoxide, potassium peroxodiphosphate, tert-butyl peroxopivalate, cumene hydroperoxide, isopropylbenzene monohydroperoxide and azobisisobutyronitrile. Examples of monomer-soluble initiators are dicetyl peroxydicarbonate, dicyclohexyl peroxydicarbonate and dibenzoyl peroxide. The initiators mentioned are generally used in an amount of from 0.001 to 0.02% by weight, preferably from 0.001 to 0.01% by weight, in each case based on the total weight of the monomers.

As redox initiators the abovementioned initiators with reducing agents are useful. Suitable reducing agents are the sulfites and bisulfites of the alkali metals and of ammonium, for example sodium sulfite, the derivatives of sulfoxylic acid such as zinc or alkali metal formaldehyde sulfoxylates, for example sodium hydroxymethanesulfinate, and ascorbic acid. The amount of reducing agent is generally from 0.001 to 0.03% by weight, preferably from 0.001 to 0.015% by weight, in each case based on the total weight of the monomers.

To control the molecular weight, regulating substances (chain transfer agents) can be used during the polymerization. If regulators are used, they are usually employed in amounts of from 0.01 to 5.0% by weight, based on the monomers to be polymerized, and are metered in separately or after premixing with reaction components. Examples of such substances are n-dodecyl mercaptan, tert-dodecyl mercaptan, mercaptopropionic acid, methyl mercaptopropionate, isopropanol and acetaldehyde.

Suitable protective colloids are polyvinyl alcohols; polyvinyl acetals; polyvinylpyrrolidones; polysaccharides in water-soluble form, e.g. starches (amylose and amylopectin), celluloses and their carboxymethyl, methyl, hydroxyethyl and hydroxypropyl derivatives; proteins such as casein or caseinate, soy protein, gelatins; lignin sulfonates; synthetic polymers such as poly(meth)acrylic acid, copolymers of (meth)acrylates with carboxyl-functional comonomer units, poly(meth)acrylamide, polyvinylsulfonic acids and their water-soluble copolymers; melamine formaldehyde sulfonates, naphthaleneformaldehyde sulfonates, and styrene-maleic acid and vinyl ether-maleic acid copolymers.

Preference is given to partially hydrolyzed or fully hydrolyzed polyvinyl alcohols having a degree of hydrolysis of from 80 to 100 mol %, in particular partially hydrolyzed polyvinyl alcohols having a degree of hydrolysis of from 80 to 95 mol % and a Hoeppler viscosity in a 4 weight percent aqueous solution of from 1 to 30 mPas (Hoeppler method at 20° C., DIN 53015). Preference is also given to partially hydrolyzed, hydrophobically modified polyvinyl alcohols having a degree of hydrolysis of from 80 to 95 mol % and a Hoeppler viscosity in a 4 weight percent aqueous solution of from 1 to 30 mPas. Examples are partially hydrolyzed copolymers of vinyl acetate with hydrophobic comonomers such as isopropenyl acetate, vinyl pivalate, vinyl ethylhexanoate, vinyl esters of saturated alpha-branched monocarboxylic acids having 5 or from 9 to 11 carbon atoms, dialkyl maleates and dialkyl fumarates, e.g. diisopropyl maleate and diisopropyl fumarate, vinyl chloride, vinyl alkyl ethers such as vinyl butyl ether, olefins such as ethene and decene. The proportion of hydrophobic units is preferably from 0.1 to 10% by weight, based on the total weight of the partially hydrolyzed polyvinyl alcohol. It is also possible to use mixtures of the polyvinyl alcohols mentioned.

Most preferred are polyvinyl alcohols having a degree of hydrolysis of from 85 to 94 mol % and a Hoeppler viscosity in 4 wt. % aqueous solution of from 3 to 15 mPas (Hoeppler method at 20° C., DIN 53015). The protective colloids mentioned are obtainable by methods known to those skilled in the art and are generally added in a total amount of from 1 to 20% by weight, based on the total weight of the monomers, in the polymerization.

If the polymerization is carried out in the presence of one or more emulsifiers, they are typically present in an amount of from 1 to 5% by weight, based on the amount of monomers. Suitable emulsifiers include anionic, cationic and nonionic emulsifiers, for example anionic surfactants such as alkyl sulfates having a chain length of from 8 to 18 carbon atoms, alkyl or alkyl aryl ether sulfates having from 8 to 18 carbon atoms in the hydrophobic radical and up to 40 ethylene oxide or propylene oxide units, alkylsulfonates or alkylarylsulfonates having from 8 to 18 carbon atoms, esters and monoesters of sulfosuccinic acid with monohydric alcohols or alkylphenols, or nonionic surfactants such as alkyl polyglycol ethers or alkyl aryl polyglycol ethers having from 8 to 40 ethylene oxide units.

After conclusion of the polymerization, an after-polymerization can be carried out using known methods to remove residual monomer, in general by means of after-polymerization initiated by a redox catalyst. Volatile residual monomers can also be removed by means of distillation, preferably under reduced pressure and if desired while passing inert entrainer gases such as air, nitrogen or steam through or over the polymerization mixture. The aqueous dispersions obtainable in this way generally have a solids content of from 30 to 75% by weight, preferably from 50 to 60% by weight.

To prepare the water-redispersible polymer powders, the aqueous dispersions are dried, if appropriate after addition of protective colloids as atomization aids, for example by means of fluidized-bed drying, freeze drying or spray drying. The dispersions are preferably spray dried. Spray drying can be carried out in customary spray drying plants, with atomization being able to be carried out by means of single-fluid, two-fluid or multifluid nozzles or a rotary disc atomizer. The exit temperature is generally set in the range from 45° C. to 120° C., preferably from 60° C. to 90° C., depending on the plant, the Tg of the resin and the desired degree of drying.

An atomization aid (protective colloid) is generally used in a total amount of from 3 to 30% by weight, preferably from 5 to 20% by weight, based on the polymeric constituents of the dispersion. Suitable atomization aids are partially hydrolyzed polyvinyl alcohols; polyvinylpyrrolidones; polysaccharides in water-soluble form, e.g. starches (amylose and amylopectin), celluloses and their carboxymethyl, methyl, hydroxyethyl and hydroxypropyl derivatives; proteins such as casein or caseinate, soy protein, gelatins; lignin sulfonates; synthetic polymers such as poly(meth)acrylic acid, copolymers of (meth)acrylates with carboxyl-functional comonomer units, poly(meth)acrylamide, polyvinylsulfonic acids and their water-soluble copolymers; melamine formaldehyde sulfonates, naphthaleneformaldehyde sulfonates, styrene-maleic acid and vinyl ether-maleic acid copolymers. Preference is given to using no protective colloids other than polyvinyl alcohols as atomization aid, with the polyvinyl alcohols preferred as protective colloids also preferably being used as atomization aid.

A content of up to 1.5% by weight of antifoam, based on the base polymer, can be advantageous during atomization. To increase the shelf life by improving the blocking stability, particularly in the case of powders having a low glass transition temperature, the powder obtained can additionally be mixed with a conventional antiblocking agent (anticaking agent), preferably in an amount of from 5 to 20% by weight, based on the total weight of polymeric constituents. Examples of conventional antiblocking agents are calcium carbonate or magnesium carbonate, talc, gypsum, silica, kaolins, and silicates, having particle sizes of preferably from 10 nm to 10 μm.

The viscosity of the feed to be atomized is adjusted via the solids content so that generally a value of <1000 mPas (Brookfield viscosity at 20 revolutions and 23° C.), preferably <250 mPas, is obtained. The solids content of the dispersion to be atomized is generally at least 35%, preferably at least 40%.

The X50 size of the particle size distribution of the redispersible polymer powder depends on drying conditions and drying equipment. X50 represents the median diameter in mm, which means that 50% by weight of the particles are smaller than this diameter. The produced water-redispersible polymer powder preferably has a X50 particle size diameter of from 5 to 200 micrometers, preferably from 10 to 150 micrometers, most preferably from 50 to 100 micrometers. The particle size distribution of the powder can be measured by laser diffraction.

The produced water-redispersible polymer powder is preferably incorporated in the reaction mixture for producing the polyurethane foam of the present invention in an amount of from about 0.1 to about 40, preferably from about 0.5 to about 20, more preferably from about 1 to about 15 parts by weight per one hundred parts of the polyether polyol or polyester polyol.

In addition to the foregoing critical components, it is often desirable to employ one or more optional additives or auxiliary compounds d) in preparing polyurethane polymers. Among these optional additives or auxiliary compounds d) are catalysts, cross-linkers, chain extenders, cell regulators, stabilizers, flame retardant additives surfactants, preservatives, flame retardants, colorants, antioxidants, reinforcing agents, stabilizers and fillers, or recycled polyurethane powder.

One or more catalysts for the reaction of the polyol with the polyisocyanate can be used. Any suitable urethane catalyst may be used, including tertiary amine compounds, amines with isocyanate reactive groups and organometallic compounds. Exemplary tertiary amine catalysts include triethylenediamine; N-methylmorpholine; N,N-dimethylcyclohexylamine; pentamethyldiethylenetriamine; tetramethylethylenediamine; bis (dimethylaminoethyl)ether; 1-methyl-4-dimethylaminoethyl-piperazine; 3-methoxy-N-dimethylpropylamine; N-ethylmorpholine; dimethylethanolamine; N-cocomorpholine; N,N-dimethyl-N',N'-dimethyl isopropylpropylenediamine; N,N-diethyl-3-diethylaminopropylamine and dimethylbenzylamine. Exemplary organometallic catalysts include organobismuth, organomercury, organolead, organoferric and organotin catalysts, with organotin catalysts being preferred among these. Suitable tin catalysts include stannous chloride, tin salts of carboxylic acids such as dibutyltin di-laurate, and stannous octoate, as well as other organometallic compounds such as are disclosed in U.S. Pat. No. 2,846,408. A preferred organobismuth catalyst is bismuth neodecanoate sold by Air Products as Dabco™ MB 20. A catalyst for the trimerization of polyisocyanates, resulting in a polyisocyanurate, such as an alkali metal alkoxide may also optionally be employed herein. The amount of amine catalyst can generally vary from 0.02 to 5 percent in the formulation. The amount of organometallic catalyst can generally vary from 0.001 to 1 percent in the formulation. Autocatalytic polyols such as those claimed in WO 01/58976 or U.S. Pat. No. 5,476,969 can be used in the polyurethane foam of the present invention.

It has surprisingly been found that the redispersible polymer powder can act as a co-catalyst in the production of a polyurethane foam. This generally allows the reduction of the amount of catalyst that is typically used in the production of a polyurethane foam in the absence of a redispersible polymer powder. Many organometallic catalysts, such as stannous octoate, tend to emit volatile organic compounds. A reduction of their use may be beneficial for ecological reasons.

In making polyurethane foam, it is generally preferred to employ an amount of a surfactant as additive or auxiliary compound d) to stabilize the foaming reaction mixture until it cures. Such surfactants advantageously comprise a liquid or solid organosilicone surfactant. Other surfactants include polyethylene glycol ethers of long-chain alcohols, tertiary amine or alkanolamine salts of long-chain alkyl acid sulfate esters, alkyl sulfonic esters and alkyl arylsulfonic acids. Such surfactants are employed in amounts sufficient to stabilize the foaming reaction mixture against collapse and the formation of large, uneven cells. Typically, 0.2 to 3 parts of the surfactant per 100 parts by weight total polyol (b) are sufficient for this purpose.

A crosslinking agent or a chain extender may be added as additive or auxiliary compound d), if desired. The crosslinking agent or the chain extender includes low-molecular weight polyhydric alcohols such as ethylene glycol, diethylene glycol, 1,4-butanediol, and glycerin; low-molecular weight amine polyol such as diethanolamine and triethanolamine; polyamines such as ethylene diamine, xlylenediamine, and methylene-bis(o-chloroaniline). The use of such crosslinking agents or chain extenders is known in the art as disclosed in U.S. Pat. Nos. 4,863,979, 4,883,825 and 4,963,399 and EP 549,120.

When preparing foams for use in transportation, a flame retardant is sometimes included as an additive d). Any known liquid or solid flame retardant can be used. Generally such flame retardant agents are halogen-substituted phosphates and inorganic flame proofing agents. Common halogen-substituted phosphates are tricresyl phosphate, tris(1,3-dichloropropyl phosphate, tris(2,3-dibromopropyl) phosphate and tetrakis (2-chloroethyl)ethylene diphosphate. Inorganic flame retardants include red phosphorous, aluminum oxide hydrate, antimony trioxide, ammonium sulfate, expandable graphite, urea or melamine cyanurate or mixtures of at least two flame retardants. In general, when present, flame retardants are added at a level of from 5 to 50 parts by weight, preferable from 5 to 25 parts by weight of the flame retardant per 100 parts per weight of the total polyol present.

Other components of polyurethane foams can be fillers, such as calcium carbonate, recycled polyurethane powder, or pigments.

Processes for producing polyurethane products are well known in the art. In general components of the polyurethane-forming reaction mixture may be mixed together in any convenient manner, for example by using any of the mixing equipment described in the prior art for the purpose such as described in "Polyurethane Handbook", by G. Oertel, Hanser publisher. The redispersible polymer powder can be added as a powder to the reaction mixture comprising a) a polyisocyanate, b) a polyether polyol or polyester polyol, c) a blowing agent, and d) optionally one or more additives or auxiliary compounds, before the reaction mixture is processed into a flexible polyurethane foam. However, preferably the redispersible polymer powder is pre-dispersed in at least one of the components a) to d) before components a), b), c) and optionally d) are mixed. More preferably, the redispersible polymer powder e) is pre-dispersed in the polyether polyol or polyester polyol.

Components a), b), c), e) and optionally d) can be stored separately prior to their use. Alternatively, a multi-component polyurethane foam-forming system can be provided which comprises a) a polyisocyanate, b) a polyether polyol or polyester polyol, c) a blowing agent, d) one or more optional additives or auxiliary compounds, and e) a redispersible polymer powder as described above. The components a) to e) can be stored in combination or separately prior to their use, provided that components a) and b) are separate components of the multi-component polyurethane foam-forming system. For the production of flexible molded polyurethane foams two-component polyurethane foam-forming systems are preferred wherein one component comprises the polyisocyanate component a) and optionally one or more additives or auxiliary compounds d) and the other component comprises the polyether polyol or polyester polyol b), the blowing agent c), the redispersible polymer powder e) and optionally one or more additives or auxiliary compounds d). For the production of flexible slabstock foams the polyurethane foam-forming system typically comprises more than 2 components.

The polyurethane products are either produced continuously or discontinuously, by injection, pouring, spraying, casting, calendering, etc; these are made under free rise or molded conditions, with or without release agents, in-mold coating, or any inserts or skin put in the mold. In case of flexible foams, those can be mono- or dual-hardness. Flexible slabstock foam is conveniently prepared by mixing the foam ingredients and dispensing them into a trough or other region where the reaction mixture reacts, rises freely against the atmosphere (sometimes under a film or other flexible covering) and cures. In common commercial scale flexible slabstock foam production, the foam ingredients or various mixtures thereof are pumped independently to a mixing head where they are mixed and dispensed onto a conveyor that is lined with paper or plastic. Foaming and curing occurs on the conveyor to form a foam bun. The resulting foams are typically from about from about 10 kg/m$^3$ to a maximum of 80 kg/m$^3$. A preferred range is from about 10 kg/m$^3$ to 60 kg/m$^3$ and more preferably from about 10 kg/m$^3$ to 50 kg/m$^3$ in density. In an even more preferred embodiment the flexible slabstock foam has a density of 40 kg/m$^3$ or less.

The applications for foams produced by the present invention are those known in the industry. Flexible and semi-flexible foams find use in applications such as bedding, furniture, automobile seats, sun visors, armrests, door panels, noise and heat insulation parts.

The following examples are given to illustrate the invention and should not be interpreted as limiting in anyway. Unless stated otherwise, all parts and percentages are given by weight. A description of the raw materials used in the examples is as follows.

| | |
|---|---|
| Voranol CP 3322 | is a triol polyol available from The Dow Chemical Company. |
| Niax A-1 | is a tertiary amine catalyst available from Momentive Performance Materials. |
| Niax L-598 | is a silicone surfactant available from Momentive Performance Materials |
| Dabco 33 LV | is a tertiary amine catalyst available from Air Products and Chemicals Inc. |
| Dabco MB 20 | is a bismuth based catalyst available from Air Products and Chemicals Inc. |
| Kosmos 29 | is Stannous Octoate available from Evonik Industries |
| Tegostab B-2370 | is a silicone based surfactant available from Evonik Industries. |
| Voranate T-80 | is an 80/20 mixture of 2,4- and 2,6- toluene diisocyanate available from The Dow Chemical Company. |
| DLP 2000 Redispersible Polymer Powder | is a free-flowing powder obtained by spray drying of an aqueous vinyl acetate-ethylene copolymer dispersion. The water-redispersible polymer powder is commercially available from The Dow Chemical Company. The copolymer has a Tg of +17° C. |
| SB redispersible powder | is a powder obtained by spray drying of an aqueous dispersion of carboxylated styrene-1,3-butadiene polymer. The polymer comprises 62 percent of styrene, 36 percent of 1,3-butadiene and 2 percent of itaconic acid in copolymerized form. The copolymer has a Tg of +12° C. Spray-drying is conducted in the presence of 2% of tetrasodium N-(1,2-dicarboxyethyl)-N-octadecyl sulfosuccinamate, commercially available under the trademark Aerosol ® 22 surfactant, 10 percent of polyvinyl alcohol and 12 percent of kaolin as anticaking agent. The polyvinyl alcohol has a degree of hydrolysis of 88 mole % and a Hoeppler viscosity of 4 mPa·s, measured as a 4 weight % aqueous solution at 20° C. according to DIN 53015. |
| NOBP-A | is a 3-functional natural oil polyol prepared using fatty acids from soy oil and has a primary hydroxyl content of 100 percent with a hydroxyl number (OH#) of 89. It is made by reacting hydroxymethylated soybean fatty acid methyl esters with a 625 molecular weight poly(ethylene oxide) triol at a 4:1 molar ratio, using 500 ppm of stannous octoate as the catalyst. The poly(ethylene oxide) triol is made by ethoxylation of glycerol at 120° C. until an equivalent weight of 209 is reached using 0.3 percent final level of KOH and finishing with synthetic magnesium silicate in a known manner, as taught, e.g., in Polyurethane Handbook, Chemistry, Raw Materials, Processing, Application, Properties edited by G. Oertel, Hanser publisher (1993, second edition) section 3.1.1.2. The resulting polyether-polyester has a viscosity of 2,700 mPa.s at 21° C., a hydroxyl equivalent weight of 640, Mn of 2500, Mw of 3550, and a polydispersity of 1.44. NOPO-1 has an average of about 3.0 hydroxyl groups/molecule. NOPO-1 contains about 70 percent natural oil. |
| NOPO-B | is a natural oil polyol commercially available from Cargill, Inc. under the trade designation BiOH, which is prepared by a process different from that used to make NOPO-A (see WO 2006/116456) and has 100 percent secondary hydroxyl groups. NOPO-B contains approximately 90 percent natural oil. |

All foam properties listed in the Tables below are tested according to ASTM D-3574-95 test method unless otherwise reported. Compression sets in % thickness loss measures the foam deformation after it has been held compressed under controlled time and temperature conditions. Airflow is in cfm (cubic foot per minute) or cubic meter per minute Compression Force Deflection (CFD) measures the load bearing ability of the foam. CFD Hardness is measured in KPa at 25%, 50% and 65% compression. The Peugeot method D-41-1003-86 is used for this Compression Force Deflection (CFD). The Sag factor is the ratio of 65% CFD to 25% CFD.

All free rise foams are made in the laboratory by preblending in a plastic cup water-redispersible polymer powder, polyol, surfactant, catalyst and water, conditioned at about 25° C. Components are stirred at 2000 RPM for 30 seconds before the isocyanate (also conditioned at about 25° C.) is added and mixed for another 5 seconds. Reactants are then poured in a 20×20×20 cm cardboard box and let rise freely. After cooling and curing for 24 hours at room temperature the foam is removed from the cardboard box and conditioned at 25 deg C. and 50% room humidity for a week before cutting and testing.

TABLE 1

| | Example (composition, weight parts) | | | |
|---|---|---|---|---|
| | A (Comp.) Control | B (Comp.) Control | 1 Invention | 2 Invention |
| Voranol CP 3322 | 100 | 100 | 100 | 100 |
| Water | 3.5 | 3.5 | 3.5 | 3.5 |
| Niax A-1 | 0.05 | 0.05 | 0.05 | 0.05 |
| Dabco 33LV | 0.15 | 0.15 | 0.15 | 0.15 |
| Kosmos 29 | 0.10 | 0.2 | 0.15 | 0.10 |
| Tegostab B2370 | 1.2 | 1.2 | 1.2 | 1.2 |
| SB L7 D11 redispersible polymer powder | — | — | 1.0 | 2.0 |
| Voranate T-80 index | 107 | 107 | 107 | 107 |
| Comment on foam | Internal Void | OK | OK | OK |
| Core density (Kg/m3) | Not Applicable (NA) | 30.0 | 31.6 | 31.9 |
| 25% CFD (KPa) | NA | 3.4 | 3.2 | 2.7 |
| 50% CFD (KPa) | NA | 4.7 | 4.5 | 3.9 |
| 65% CFD (KPa) | NA | 7.3 | 7.1 | 6.3 |
| Sag factor | NA | 2.2 | 2.2 | 2.3 |
| Airflow (cf/min.//m3/min.) | NA | 2.6//0.006 | 2.5//0.006 | 2.9//0.007 |
| Resiliency (%) | NA | 42 | 42 | 45 |
| 50% Compression set | NA | 6.1 | 5.9 | 7.1 |
| 75% Compression set | NA | 6.6 | 5.3 | 6.1 |

The results in Table 1 illustrate that the incorporation of a water-redispersible polymer power in the reaction mixture for producing the polyurethane foam allows the use of a reduced amount of Kosmos 29 (stannous octoate), which is known to emit volatile organic compounds VOC), while still providing equivalent airflow values of the flexible foam. Control A gives large internal voids, hence unusable foam. By adjusting the amount of water-redispersible polymer power, the foam resiliency and foam hardness can be adjusted.

TABLE 2

| | Example (composition, weight parts) | |
|---|---|---|
| | 3 Invention | 4 Invention |
| Voranol CP 3322 | 100 | 100 |
| Water | 3.5 | 3.5 |
| Niax A-1 | 0.05 | 0.05 |
| Dabco 33LV | 0.15 | 0.15 |
| Stannous Octoate | 0.20 | 0.15 |
| Tegostab B2370 | 1.2 | 1.2 |
| DLP 2000 redispersible polymer powder | 2.0 | 4.0 |
| Voranate T-80 index | 107 | 107 |
| Core density (Kg/m3) | 31.4 | 31.7 |
| 25% CFD (KPa) | 3.2 | 2.6 |
| 50% CFD (KPa) | 4.5 | 3.8 |
| 65% CFD (KPa) | 7.1 | 6.1 |
| Sag factor | 2.2 | 2.3 |
| Airflow (cubic foot per min.//m3/min.) | 2.0//0.004 | 3.1//0.007 |
| Resiliency (%) | 41 | 44 |
| 50% Compression set | 5.8 | 5.6 |
| 75% Compression set | 6.8 | 5.8 |

The results in Table 2 illustrate that by adjusting the amount of water-redispersible polymer power in the reaction mixture for producing the polyurethane foam, the foam resiliency and foam hardness can be adjusted. The optimum amount of water-redispersible polymer power depends on the chosen water-redispersible polymer power and on the desired the foam resiliency and foam hardness. Compression set values confirm that foam aging characteristics are not affected by incorporation of redispersible polymer in the foam matrix.

TABLE 3

| | Example (composition, weight parts) | |
|---|---|---|
| | 5 Invention | B (Comparison) Control |
| Voranol CP 3322 | 30 | 60 |
| NOPO-A | 40 | 40 |
| NOPO-B | 30 | — |
| Water | 2.8 | 2.8 |
| Niax A-1 | 0.10 | 0.10 |
| Dabco 33LV | 0.40 | 0.20 |
| Dabco MB 20 | 0.24 | 0.24 |
| Niax L-598 | 1.0 | 1.0 |
| DLP 2000 | 10 | — |

TABLE 3-continued

| | Example (composition, weight parts) | |
|---|---|---|
| | 5 Invention | B (Comparison) Control |
| Voranate T-80 index | 105 | 105 |
| Core density (Kg/m3) | 40.9 | 37.9 |
| 25% CFD (KPa) | 2.7 | 2.9 |
| 50% CFD (KPa) | 5.0 | 4.6 |
| 65% CFD (KPa) | 10 | 7.8 |
| Sag factor | 3.7 | 2.7 |
| Resiliency (%) | 32 | 28 |

The results in Table 3 illustrate that the incorporation of a water-redispersible polymer power in the reaction mixture for producing the polyurethane foam provides a foam with higher resilience in spite of the use of a high amount of natural oil polyols. The use of natural oil polyols in formulations for producing polyurethane foams are known to decrease the resilience of the foam.

What is claimed is:

1. A multi-component polyurethane foam-forming system, the system comprising:
   a) a polyisocyanate,
   b) a polyether polyol or polyester polyol, a) and b) being separate components of the multi-component polyurethane foam-forming system,
   c) a blowing agent,
   d) one or more optional additives or auxiliary compounds, and
   e) a water-redispersible polymer powder that comprises a homopolymer or copolymer of one or more monomers from the group of vinyl esters of unbranched or branched alkylcarboxylic acids having from 1 to 15 carbon atoms, methacrylic esters, and acrylic esters of alcohols having from 1 to 15 carbon atoms, vinylaromatics, and olefins, the homopolymer or copolymer having a glass transition temperature Tg from −20° C. to +50° C., wherein:
   the water-redispersible polymer powder is a dried powder of an aqueous dispersion of the homopolymer or copolymer and a protective colloid included in an amount from 3 to 30 wt % based on a total weight of the homopolymer or copolymer, the dried powder being redispersible in the polyether polyol or polyester polyol, and
   the water-redispersible polymer powder is dispersed in the polyether polyol or polyester polyol, an amount of the water-redispersible polymer powder being from 0.1 to 40 parts by weight per one hundred parts of the polyether polyol or polyester polyol, and a X50 particle size diameter being from 50 to 100 micrometers of the water-redispersible polymer powder dispersed in the polyether polyol or polyester polyol.

2. The polyurethane foam-forming system of claim 1 wherein the water-redispersible polymer powder comprises a copolymer of vinyl acetate, ethylene, and one or more optional comonomers or a carboxylated styrene/ 1,3-butadiene copolymer.

3. A polyurethane foam produced from:
   a) a polyisocyanate,
   b) a polyether polyol or polyester polyol,
   c) a blowing agent,
   d) one or more optional additives or auxiliary compounds, and
   e) a water-redispersible polymer powder that comprises a homopolymer or copolymer of one or more monomers from the group of vinyl esters of unbranched or branched alkylcarboxylic acids having from 1 to 15 carbon atoms, methacrylic esters and acrylic esters of alcohols having from 1 to 15 carbon atoms, vinylaromatics, and olefins, the homopolymer or copolymer having a glass transition temperature Tg from −20° C. to +50° C., wherein:
   the water-redispersible polymer powder is a dried powder of an aqueous dispersion of the homopolymer or copolymer and a protective colloid included in an amount from 3 to 30 wt % based on a total weight of the homopolymer or copolymer, the dried powder being redispersible in the polyether polyol or polyester polyol, and
   the water-redispersible polymer powder is dispersed in the polyether polyol or polyester polyol in an amount from 0.1 to 40 parts by weight per one hundred parts of the polyether polyol or polyester polyol, and a X50 particle size diameter being from 50 to 100 micrometers of the water-redispersible polymer powder dispersed in the polyether polyol or polyester polyol.

4. The polyurethane foam of claim 3 wherein the water-redispersible polymer powder comprises a copolymer of vinyl acetate, ethylene and one or more optional comonomers or a carboxylated styrene/ 1,3-butadiene copolymer.

5. A process for forming a polyurethane foam, the process comprising:
   a) incorporating a polyisocyanate, a polyether polyol or polyester polyol, a blowing agent, and one or more optional additives or auxiliary compounds into a reaction mixture prior to forming the polyurethane foam,
   b) dispersing in the polyether polyol or polyester polyol a water-redispersible polymer powder that comprises a homopolymer or copolymer of one or more monomers from the group of vinyl esters of unbranched or branched alkylcarboxylic acids having from 1 to 15 carbon atoms, methacrylic esters and acrylic esters of alcohols having from 1 to 15 carbon atoms, vinylaromatics, and olefins, the homopolymer or copolymer having a glass transition temperature Tg from −20° C. to +50° C., wherein:
   the water-redispersible polymer powder is a dried powder of an aqueous dispersion of the homopolymer or copolymer and a protective colloid included in an amount from 3 to 30 wt % based on a total weight of the homopolymer or copolymer, and
   the water-redispersible polymer powder is dispersed in the polyether polyol or polyester polyol in an amount from 0.1 to 40 parts by weight per one hundred parts of the polyether polyol or polyester polyol.

6. A method of increasing the resilience of a flexible polyurethane foam, the method comprising:
   incorporating a water-redispersible polymer powder into a reaction mixture, wherein:
   the water-redispersible polymer powder comprises a homopolymer or copolymer of one or more monomers from the group of vinyl esters of unbranched or branched alkylcarboxylic acids having from 1 to 15 carbon atoms, methacrylic esters and acrylic esters of alcohols having from 1 to 15 carbon atoms, vinylaromatics, and olefins, the homopolymer or copolymer having a glass transition temperature Tg from −20° C. to +50° C., wherein:
   the water-redispersible polymer powder is a dried powder of an aqueous dispersion of the homopolymer or copolymer and a protective colloid included in an amount from 3 to 30 wt % based on a total weight of the homopolymer or copolymer, the reaction mixture includes a) a polyisocyanate, b) a polyether polyol or polyester polyol, c) a blowing agent, and d) one or more optional additives or auxiliary compounds, the water-redispersible polymer powder being redispersible in the polyether polyol or polyester polyol, and the water-redispersible polymer powder is dispersed in the polyether polyol or polyester polyol in an amount from 0.1 to 40 parts by weight per one hundred parts of the polyether polyol or polyester polyol, and processing the reaction mixture into a flexible polyurethane foam.

7. The polyurethane foam-forming system of claim 1 wherein the dried powder of the water-redispersible polymer powder is a spray dried powder of the aqueous dispersion of the homopolymer or copolymer and the protective colloid.

8. The polyurethane foam of claim 3 wherein the dried powder of the water-redispersible polymer powder is a spray dried powder of the aqueous dispersion of the homopolymer or copolymer and the protective colloid.

9. The process of claim 5 wherein the dried powder of the water-redispersible polymer powder is a spray dried powder of the aqueous dispersion of the homopolymer or copolymer and the protective colloid.

10. The process of claim 5 wherein a X50 particle size diameter is from 50 to 100 micrometers of the water-redispersible polymer dispersed in the polyether polyol or polyester polyol.

11. The method of claim 6 wherein the dried powder of the water-redispersible polymer powder is a spray dried powder of the aqueous dispersion of the homopolymer or copolymer and the protective colloid.

12. The method of claim 6 wherein a X50 particle size diameter is from 50 to 100 micrometers of the water-redispersible polymer dispersed in the polyether polyol or polyester polyol.

* * * * *